(No Model.)

E. S. LEAYCRAFT.
PIPE COUPLING.

No. 279,575. Patented June 19, 1883.

Witnesses
Charles F. Poe
R. S. Van Boskerck

Inventor
E. S. Leaycraft

UNITED STATES PATENT OFFICE.

EDWIN S. LEAYCRAFT, OF JERSEY CITY, NEW JERSEY.

PIPE-COUPLING.

SPECIFICATION forming part of Letters Patent No. 279,575, dated June 19, 1883.

Application filed January 11, 1883. (No model.)

*To all whom it may concern:*

Be it known that I, EDWIN S. LEAYCRAFT, a citizen of the United States, residing at Jersey City, in the State of New Jersey, have invented a new and useful Improvement in Pipe-Couplings, of which the following, taken in connection with the accompanying drawings, is a full, clear, and accurate description.

The object of my improvement is to produce an elastic yielding and tight-fitting clamp to connect sections of pipe.

Figure 1:
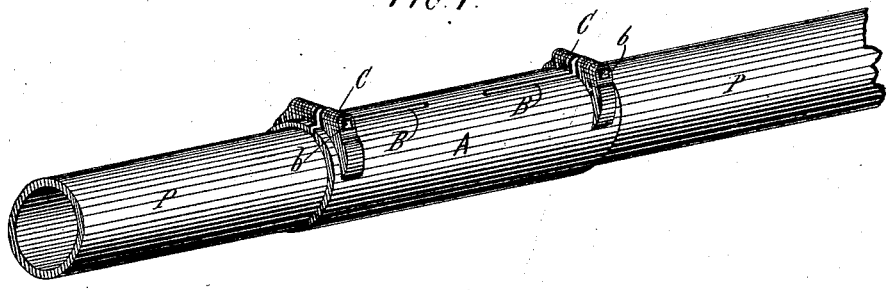
Figure 2:
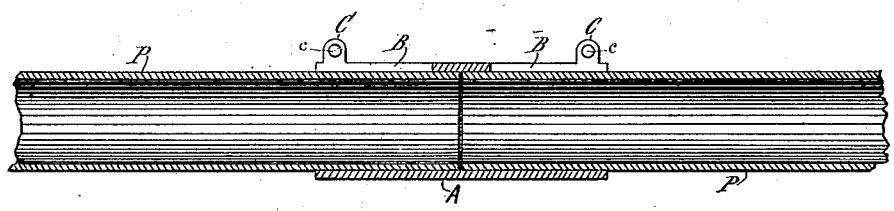

In the drawings, Figure 1 represents two sections of pipe joined together by my improved clamp. Fig. 2 represents a cross-section of the same.

P P represent the sections of pipe to be coupled.

A represents the clamp or tubing, in each end of which is cut a slot or slit, B, extending about one-third of the length of the clamp from each end, thus leaving a solid piece of tubing between the slots or slits. At each end of the clamp are attached the two lugs C C, one on each side of the slot or slit B. Through each of these lugs C is the hole c, through which holes are passed proper screws or clamps, b.

Instead of using the lugs C with the screws or clamps b, the ends of the slitted tubing A may be brought together by means of rings or other suitable means.

The mode of operation of my improved clamp is as follows: The clamp A being slipped over the adjoining pieces of pipe to be coupled, the screws or clamps b are passed through the holes c of the lugs C and tightly adjusted, thus bringing the edges of the slots or slits B together and coupling tightly the sections of pipe, while the solid portion of the tubing or clamp A covers completely the jointure of the sections of pipe P P.

The great advantage of this coupling is that the solid portion of the tubing A, between which the sections of pipe join, presses with a uniform and equal pressure, while the slitted portions of the tubing A, being elastic and yielding by reason of their slots, hold firmly the sections of pipe, and, in combination with the solid portion of tubing between them, resist any tendency of the pipes, clamp, or tubing to twist or bend, which frequently occurs in cases where clamps are formed with slots extending through their entire length.

Having thus described my invention, what I claim, and desire to secure by Letters Patent, is—

1. A clamp or coupling for pipe-sections, having a longitudinal slot cut inward from each end, leaving a solid center to cover the meeting ends of the pipes, said slotted ends being provided with perforated lugs, the inner faces of which are in line with the inner faces of said slots, substantially as shown and specified.

2. An improved clamp or tubing for coupling sections of pipe, provided with slots or slits cut from each end thereof, partially through its length, and having a solid portion of tubing between said slots or slits, combined with lugs provided with proper means for securing the clamp to the sections of pipe.

In testimony whereof I have hereunto set my hand this 30th day of December, 1882.

E. S. LEAYCRAFT.

In presence of—
CHARLES G. COE,
R. T. VAN BOSKERCK.